US005912712A

United States Patent [19]

Doherty

[11] Patent Number: 5,912,712

[45] Date of Patent: Jun. 15, 1999

[54] TIME EXPANSION OF PULSE WIDTH MODULATION SEQUENCES BY CLOCK DROPPING

[75] Inventor: Donald B. Doherty, Richardson, Tex.

[73] Assignee: Texas Instruments Incorporated, Dallas, Tex.

[21] Appl. No.: 09/076,335

[22] Filed: May 11, 1998

Related U.S. Application Data

[60] Provisional application No. 60/046,446, May 14, 1997.

[51] Int. Cl.[6] ....... H04N 7/24

[52] U.S. Cl. ....... 348/471

[58] Field of Search ....... 363/41, 42; 348/295, 348/302, 439, 471, 472

[56] References Cited

U.S. PATENT DOCUMENTS

| | | | |
|---|---|---|---|
| 4,189,669 | 2/1980 | Van Loon et al. | 318/811 |
| 4,236,114 | 11/1980 | Sasaki | 328/58 |
| 5,764,165 | 6/1998 | Buch | 341/53 |
| 5,812,595 | 9/1998 | Jandu | 375/219 |

*Primary Examiner*—Matthew Nguyen
*Attorney, Agent, or Firm*—Charles A. Brill; Frederick J. Telecky; Richard L. Donaldson

[57] ABSTRACT

A method for expanding pulse width modulation sequences that control a display system to adapt to varying video frame times. A minimal amount of extra circuitry (10) is provided that regulates a sequencer (26). After calculating the appropriate expansion factor needed to stretch a base sequence, the system control circuit (22) sends that information to the circuitry (10). The circuitry (10) includes a counter (14) that repetitively counts down a number of clock cycles and causes the clock to drop a cycle. This dropping of clock cycles causes the sequence time to be expanded, as it takes the system longer to reach the necessary number of clock cycles that determine a sequence. Several base pulse width modulation sequences could be stored in memory, each of which can be used for a range of frame times, eliminating the need for one sequence for every possible variation in the frame time.

15 Claims, 1 Drawing Sheet

TIME EXPANSION OF PULSE WIDTH MODULATION SEQUENCES BY CLOCK DROPPING

This application claims priority under 35 U.S.C. § 119 (e) (1) of provisional application number 60/046,446 filed May 14, 1997.

BACKGROUND OF THE INVENTION

1. Field of the Invention

This invention relates to digital pulse width modulated (PWM) display systems, more particularly to those digital PWM systems that receive display data with varying frame rates and that store PWM sequences in memory for each frame rate.

2. Background of the Invention

Digital PWM systems typically display data in the format of one sample of data per picture element (pixel) on the final image. The PWM scheme is dependent upon how many bits per pixel are generated for the given image. For example, a 4-bit system would display the most significant bit (MSB) for 8/15 the frame time, the next MSB for 4/15 the frame time, the next to least significant bit (LSB) for 2/15 the frame time, and the LSB for 1/15 the frame time. It should be noted that the LSB time is equal to 1 divided by $2^i-1$ where i is the number of bits per sample. This is referred to as the LSB time, and the higher order bit times are typically discussed as multiples of this LSB time, with the MSB have 8 LSB times, etc. The exact order and duration of PWM bits is called a PWM sequence.

As can be seen from the above discussion, the LSB time is tightly coupled with the frame time, as it depends upon the frame time for determining its length. In order for a display system to handle a range of frame rates, several PWM sequences must be stored and interpreted in real time to initiate data transfer to the display system with the correct timing. PWM sequences could be used that were not adapted for the varying frame rates. However, more tightly coupled sequences are more efficient because more of the available time can be used for light output.

The storing of several of these sequences in memory increases the need for memory and thereby increases the cost for the system. Therefore, a method is needed that allows for tight coupling between the PWM sequence and the frame rate, yet does not require large amounts of memory.

SUMMARY OF THE INVENTION

One aspect of the invention is a method for expanding the PWM sequence time for a display system having a varying frame rate. The time between each two events in a PWM sequence is set to be a predetermined number of clock cycles of a sequencer clock. A drop count is calculated by the system processor and sent to a counter. When the counter counts down from or up to that count, a signal is sent which causes the sequencer clock to drop a count. This increases the sequence time by causing the sequencer clock to reach the predetermined number of cycles in a longer amount of time than previously.

A second aspect of the invention is a logic circuit which enables the system processor to cause the sequencer clock to drop a count. The circuit includes a register which receives the count and an enabling signal. The enabling signal controls whether the clock dropping operation is enabled or disabled. When a predetermined number is reached, the counter sends a signal to a logic circuit. When clock dropping is enabled, the logic circuit causes the sequencer clock to miss a cycle, thereby causing it to take longer to reach the predetermined number of cycles per frame.

It is an aspect of the invention that the expansion method reduces the number of PWM sequences that need to be stored in memory.

It is a further advantage of the invention in that it does not contribute a significant amount of circuitry to the overall system, thereby minimizing additional cost.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
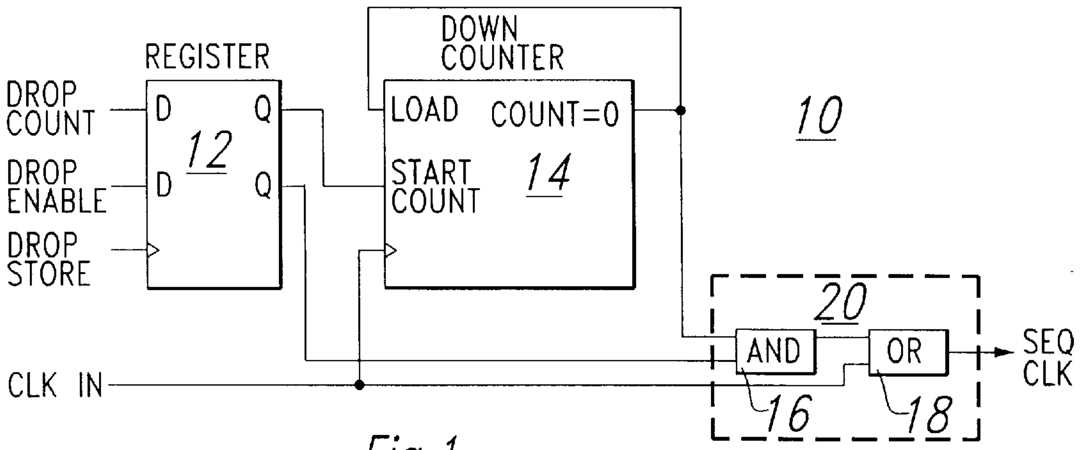
FIG. 1 shows an embodiment of a clock dropping circuit for use in a PWM display system.
Figure 2:
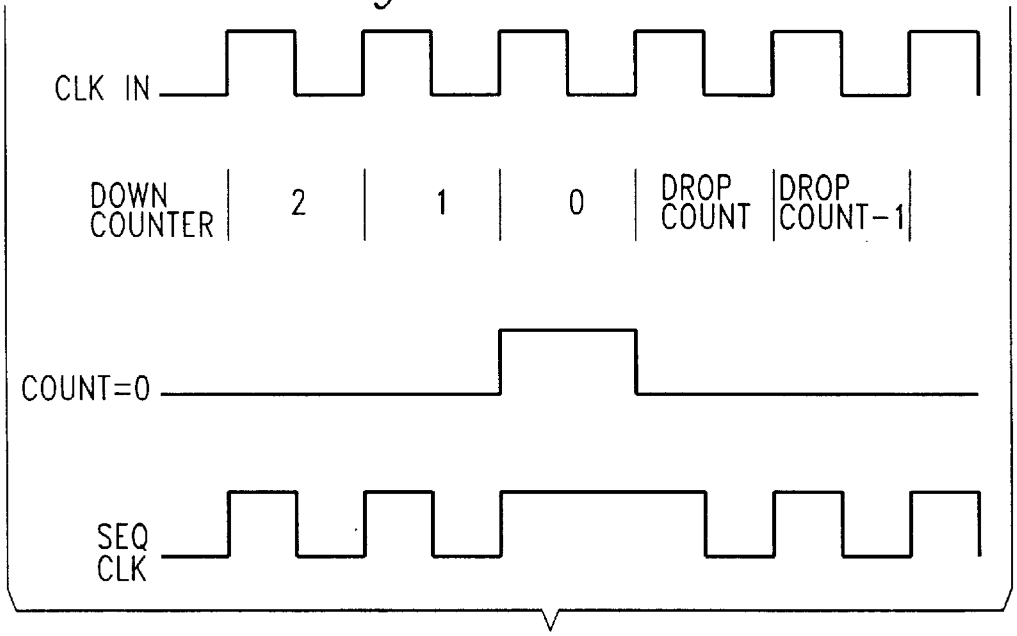
FIG. 2 shows one example of a timing diagram for a clock dropping PWM display system.

Most pulse width modulated display systems rely upon the length of the display frame time to determine the necessary brightness for a given pixel in the final image. Variations in the frame must be accounted for in the PWM sequence to maintain the efficiency of the system, where efficiency is defined as using more time for light output.

PWM systems typically store the sequences in some type of memory such as programmable read-only memory (PROM). Sequence control hardware is used to interpret these sequences and control the data transfer to the display device. The size of these sequences and the number necessary to maintain system efficiency can be rather large.

One example of a display device using PWM is a spatial light modulator array. The array typically comprises individual elements in an x–y grid, with each element or a predefined number of elements corresponding to one pixel on the final image. For ease of discussion, examples will be limited to those which have one element per pixel, with no intention of limiting the scope of this invention to that embodiment.

Data is displayed by the PWM data being loaded into the control circuitry for each element. The PWM sequence determines how much light is sent to the display surface for each bit of the data for that pixel. At the predetermined intervals within the sequence, new data for the next bit is sent to the control circuitry and the elements are "reset" to accept this new data. When all of the elements are reset at the same time, it will be referred to as global reset.

An alternative to global reset is phased, or divided, reset. The array of elements on the modulator are divided into reset groups and handled separately, the PWM sequence contains more instruction and therefore requires more memory. Phased reset provides several advantages, however, such as brightness enhancement and artifact mitigation.

A typical global reset device may have 200 sequences stored in memory. A phased reset device may require as many as 20 times the instructions of a global reset device. Therefore, a phased reset device may result in 20 times more memory required to operate.

Presently, most of the sequences generated fall into a families of sequences, where each sequence in a family is related to a base sequence, with several families existing. The sequences within a family are the family base sequence expanded in time by varying factors. These could be generated dynamically by slowing down the sequencer clock so that the actual sequence time matches the frame rate. The sequencer clock is a stable clock input that is counted. When the count is reached that has been predetermined to equal the frame time, without taking into account any variations in the frame time, the next frame of data is processed, which requires the PWM sequence to start over.

One approach is to use a phase locked loop (PLL) anchored to the frame period. Only the base sequences would then be stored in memory. This relieves the system of providing a much larger memory but adds the cost associated with PLL circuitry. As mentioned above, one of the problems with storing more than the base sequences in memory is the added cost. The PLL approach does not solve this problem satisfactorily.

One embodiment of the invention is the addition of a minimal amount of logic circuitry as shown in FIG. 1. The circuitry is limited to a counter and some logic circuitry. This will not increase the cost of the system in any significant way and therefore overcomes the problems associated with the PLL approach.

The counter 14 has a down counter as shown, however, an up counter could be used as well. The counter is loaded with a count from a register and when the counter reaches zero, it sends a signal to the logic circuitry 20. The logic circuitry 20 is connected directly to the clock coming into the control circuitry of the system.

As discussed above, the sequence time equals the amount of time it takes for the clock to cycle a predetermined number of times. When the logic circuitry receives the proper signals the sequencer clock "drops" or misses a cycle. This lengthens the time the clock takes to reach its predetermined count, thereby lengthening the sequence time. The derivation of these signals will be discussed in more detail later.

The number of times the clock is dropped then determines the amount of time by which the sequence time is increased. The proper number of dropped counts for each variation in the frame time can then be determined. The time expansion factor for a sequence executed with a drop count of N is given by:

$$F_N = \frac{N+1}{N} \tag{1}$$

The factor, $F_N$, can be used to find the effective sequence rate, $f_N$, or period, $P_N$, by:

$$f_N = \frac{f_b}{F_N} \tag{2}$$

and $$P_N = F_N P_b \tag{3}$$

where $f_b$ and $P_b$ are the base sequence frequency and period, or sequence time, respectively.

The maximum drop count required determines the number of bits needed for the counter. This is determined by:

$$\text{counter\_bits} = \text{ceiling}\left(\log_2\left(\max\left(\frac{P_i}{D_j}\right)\right)\right) \tag{4}$$

over all valid combinations of i and j where $P_i$ is a frame period required for the system and $D_j$ is a time difference allowed between sequence lengths.

The usable frame frequency range covered by each base sequence depends on the maximum time difference, D, allowed between sequence lengths which will be referred to as the spacing. The minimum usable drop count, $N_{min}$, for a base sequence period, $P_b$, is given by:

$$N_{\min} = \text{ceiling}\left(\frac{\sqrt{1+4\frac{P_b}{D}}-1}{2}\right). \tag{5}$$

The minimum number of base sequences required in a video system can be determined by starting with the maximum frame rate. For an example, the maximum frame rate of a system will be assumed to be 76 Hz. Since frequency and period are inverses of each other, this sets the period at 0.0131579 seconds, or 13157.9 μsecs. Assuming further that the system has a maximum allowable spacing of 50 μsecs, which is D, equation 5 can then be used to determine the minimum drop count, $N_{min}$. Using the above numbers in the present example, $N_{min}$ is the ceiling of 15.729. The ceiling function in equation 5 finds the next highest integer of the number upon which it operates, which would result in a drop count of 16.

The range of that particular base sequence is found using either equations 1 and 2, or 1 and 3. In the tables below $f_{end}$ could also be defined as $f_{Nmin}$. Using equations 1 and 2, $f_N$=76/(17/16)=71.529 Hz, with the period $P_{end}$ being 13980.3 μsecs. The next base sequence is found by using as the base sequence period, $P_{end}$+D, which in this case is 13980.3+50=14030.3 μsecs. The next base sequence rate is 71.275 Hz. This process is then repeated for this base sequence and continued until the entire system frequency range has been covered.

The following tables show these calculations for three different systems. The first system has a frame rate range of 76 to 49 Hz and the second with a frame rate range of 63 to 48 Hz. Both of these systems have 50 μsec spacing. A third example is shown with a frame rate range of 74.82 to 18 Hz with 150 μsec spacing.

System 1: 76–49 Hz, 50 μsec spacing

| Base No. | $f_b$ (Hz) | $P_b$ (μsecs) | Min drop count | $P_{ens}$ (μsecs) | $f_{end}$ (Hz) |
|---|---|---|---|---|---|
| 1 | 76.000 | 13157.9 | 16 | 13980.3 | 71.529 |
| 2 | 71.275 | 14030.3 | 17 | 14855.6 | 67.315 |
| 3 | 67.089 | 14905.6 | 17 | 15782.4 | 63.362 |
| 4 | 63.132 | 15832.4 | 18 | 16711.9 | 59.837 |
| 5 | 59.659 | 16761.9 | 18 | 17693.2 | 56.519 |
| 6 | 56.360 | 17743.2 | 19 | 18677.0 | 53.542 |
| 7 | 53.399 | 18727.0 | 19 | 19712.6 | 50.729 |
| 8 | 50.601 | 19762.9 | 20 | 20750.8 | 48.191 |

System 2: 63–48 Hz, 50 μsec spacing

| Base No. | $f_b$ (Hz) | $P_b$ (μsecs) | Min drop count | $P_{end}$ (μsecs) | $f_{end}$ (Hz) |
|---|---|---|---|---|---|
| 1 | 63.000 | 15873.0 | 18 | 16754.9 | 59.684 |
| 2 | 59.507 | 16804.9 | 18 | 17738.5 | 56.375 |
| 3 | 56.216 | 17788.5 | 19 | 18724.7 | 53.405 |
| 4 | 53.263 | 18774.7 | 19 | 19762.8 | 50.600 |
| 5 | 50.472 | 19812.8 | 20 | 20803.5 | 48.069 |
| 6 | 47.954 | 20835.5 | 20 | 21896.1 | 45.670 |

System 3: 74.82–18 Hz with 150 μsec spacing

| Base No. | $f_b$ (Hz) | $P_b$ (μsecs) | Min drop count | $P_{ens}$ (μsecs) | $f_{end}$ (Hz) |
|---|---|---|---|---|---|
| 1 | 74.820 | 13365.4 | 9 | 14850.5 | 67.338 |
| 2 | 66.665 | 15000.5 | 10 | 16500.5 | 60.604 |
| 3 | 60.058 | 16650.5 | 11 | 18164.2 | 55.053 |
| 4 | 54.602 | 18314.2 | 11 | 19979.1 | 50.052 |
| 5 | 49.679 | 20129.1 | 12 | 21806.5 | 45.858 |
| 6 | 45.545 | 21956.5 | 12 | 23786.2 | 42.041 |
| 7 | 41.778 | 23936.2 | 13 | 25777.5 | 38.794 |
| 8 | 38.569 | 25927.5 | 13 | 27921.9 | 35.814 |
| 9 | 35.623 | 28071.9 | 14 | 30077.1 | 33.248 |
| 10 | 33.083 | 30227.1 | 14 | 32386.1 | 30.877 |
| 11 | 30.735 | 32536.1 | 15 | 34705.2 | 28.814 |
| 12 | 28.690 | 34855.2 | 15 | 37178.9 | 26.897 |
| 13 | 26.789 | 37328.9 | 16 | 39664.9 | 25.213 |
| 14 | 25.118 | 39811.9 | 16 | 42300.2 | 23.641 |
| 15 | 23.557 | 42450.2 | 17 | 44947.3 | 22.248 |
| 16 | 22.174 | 45097.3 | 17 | 47750.0 | 20.942 |
| 17 | 20.877 | 47900.0 | 18 | 50561.2 | 19.778 |
| 18 | 19.720 | 50711.2 | 18 | 53528.4 | 18.682 |
| 19 | 18.629 | 53678.4 | 19 | 56503.6 | 17.698 |

These tables are only intended as examples and are in no way intended to limit the range of frame rates or the spacing. More base sequences could be added to take advantage of breakpoints specific to a given PWM scheme.

Figure 3:
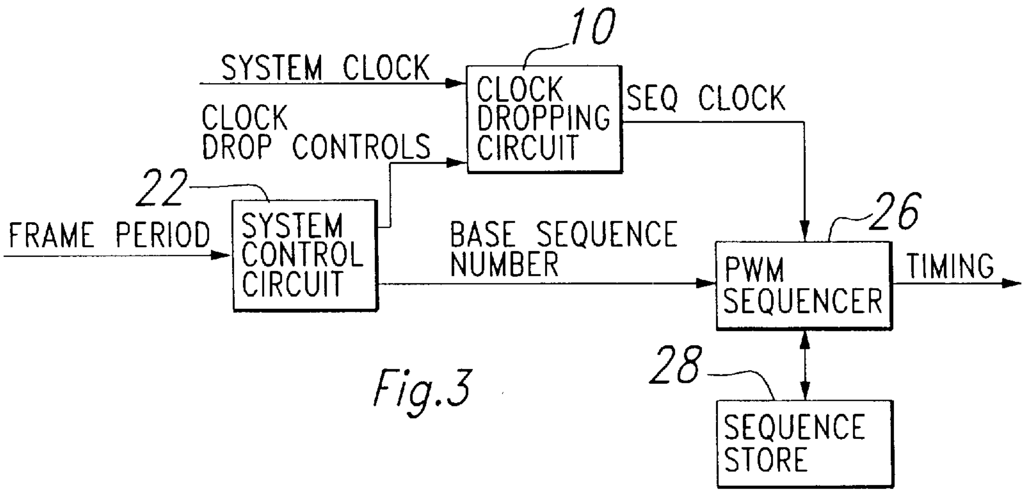
FIG. 3 shows an embodiment of a clock dropping circuit with other system circuitry to enable clock dropping in a display system.

The determination of inputs to the clock dropping circuit would be done as often as necessary to match changes in frame rate within a specified system tolerance. Once the length of the frame is determined, either by measurement or from a system command, a system control circuit 22 as shown in FIG. 3 generates the DROP ENABLE and DROP COUNT signals and causes them to be stored in register 12 by activating the DROP STORE signal. The system control circuit will perform the measurement if necessary, or receive the command that determines the frame time.

The first step in generating the clock dropping control signals is to select the base sequence that most closely matches the frame period. This base sequence is the one with the longest base period that is less than or equal to the frame period. The system control circuit performs the necessary calculations and selects the correct base sequence. The system control circuit sends the selected base sequence number to the PWM sequencer 26 so that the correct sequence program can be retrieved from the sequence store 28, which may be a PROM.

The DROP COUNT can then be calculated to match the sequence period to the frame period, $P_f$, by:

$$\text{DROP\_COUNT} = \left(\frac{P_b}{P_f - P_b}\right) \tag{6}$$

where $P_b$ is the base sequence period. If $P_f = P_b$ or if DROP COUNT is too large for the implemented counter, then DROP ENABLE is set to disable clock dropping and cause no sequence expansion. Otherwise, DROP ENABLE is set to enable clock dropping. In either case, the control signals are latched in register 12.

As an example for System 1 in the tables above, suppose that the frame rate is 60 Hz yielding a frame period of 16666.7 μsecs. The optimum base sequence from the table is number 4 with a base period of 15832.4 μsecs. The system control circuit commands the PWM sequencer to retrieve sequence number 4 from the sequence PROM. The DROP COUNT is calculated from equation 6 to be 19. The system control circuit finally sets DROP ENABLE to enable clock dropping and sends the commands to the clock dropping circuit 10. The resulting sequencer clock is sent to the PWM sequencer 26 which generates the appropriate timing signals for the display device.

These calculations would typically be done by the ALU of the system processor. Alternatively, the clock dropping controls could be precalculated and stored in a lookup table. Note that the register in FIG. 1 is shown as a flip/flop, but could be any type of register that transmits the signals required when indicated by the system processor.

When the count on counter 14 equals zero, the logic circuitry 20 would, if enabled, then cause the sequencer clock to drop a clock, resulting in the expansion of the sequence time. When the count equals zero, the LOAD signal on the down counter would cause the count to be reloaded so it could start counting down to the next dropped clock. The counter could also count up to a predetermined number, rather than down. The down counter shown is only shown as an example.

The clock dropping circuit is therefore used to increase the range of frame rates to which the PWM sequences can be coupled. Meanwhile, the amount of extra hardware needed is minimized, in addition to the limit on the memory discussed above.

Thus, although there has been described to this point a particular embodiment for a method and structure for time expanded pulse width modulation, it is not intended that such specific references be considered as limitations upon the scope of this invention except in-so-far as set forth in the following claims.

What is claimed is:

1. A method for controlling PWM sequence times in a display system, comprising the steps of:

a) setting said PWM sequence time in said system to be substantially equal to a predetermined number of clock cycles of a sequencer clock;

b) expanding said PWM sequence time by causing said sequencer clock to drop counts, thereby delaying said sequencer clock reaching said predetermined number of clock cycles, resulting in an expanded PWM sequence time; and c) selecting one of a series of base pulse width modulation sequences, wherein said selection of said one sequence is based upon a display frame time.

2. The method as claimed in claim 1, wherein a counter set with a predetermined drop count determines how often said sequencer clock drops counts.

3. The method as claimed in claim 2, wherein said counter is a down counter.

4. The method as claimed in claim 2, wherein said counter is an up counter.

5. The method as claimed in claim 1, wherein each said sequence has a range of frame times for which it can be used.

6. A circuit operable to cause a sequencer clock in a display system to drop counts, comprising:

a) a register for receiving a drop count, a drop enable signal and a clock signal from a system control circuit;

b) a counter operable to receive said drop count and repetitively count said drop count clock periods wherein said counter sends a signal upon reaching the end of each counting cycle; and c) a logic circuit operable to receive said drop enable signal and said signal indicating that said counter has reached the end of said counting cycle, upon which reception said logic circuit causes said sequencer clock to drop a count, thereby expanding a sequence time for said display system.

7. The method as claimed in claim 6, wherein said counter is an down counter.

8. The method as claimed in claim 6, wherein said counter is an up counter.

9. The method as claimed in claim 6, wherein said logic circuit further comprises an AND gate and an OR gate.

10. The method as claimed in claim 6 wherein said register is a flip/flop.

11. A method for performing system control of a PWM system with clock dropping, comprising:

a) receiving a frame period signal;

b) determining a frame period from said frame period signal;

c) selecting a base PWM sequence based upon said frame period;

d) providing said base PWM sequence to a PWM sequencer;

e) determining a number of drop counts dependent upon a difference between said base sequence and said frame period; and f) sending said number of drop counts to a clock dropping circuit along with clock dropping control signals, thereby causing said clock dropping circuit to expand said base sequence appropriately for said frame period.

12. The method as claimed in claim 11, wherein said frame period signal is used to measure said frame period.

13. The method as claimed in claim 11, wherein said frame period signal is a command indicating the frame period.

14. The method as claimed in claim 11, wherein said drop count is determined by calculation.

15. The method as claimed in claim 11, wherein said drop count is determined by finding an appropriate drop count in a look up table.

* * * * *